United States Patent [19]

Sasaki et al.

[11] Patent Number: 5,572,426
[45] Date of Patent: Nov. 5, 1996

[54] APPARATUS AND METHOD FOR CONTROLLING DAMPING FORCE CHARACTERISTIC OF VEHICULAR SHOCK ABSORBER

[75] Inventors: Mitsuo Sasaki; Toshiro Hirai, both of Atsugi, Japan

[73] Assignees: Unisia Jecs Corporation; Nissan Motor Co., Ltd., Japan

[21] Appl. No.: 305,282

[22] Filed: Sep. 12, 1994

[30] Foreign Application Priority Data

Sep. 13, 1993 [JP] Japan .................................. 5-227066

[51] Int. Cl.⁶ .................................................. B60G 17/015
[52] U.S. Cl. ...................... 364/424.05; 280/707; 280/840
[58] Field of Search ........................ 364/424.05; 280/707, 280/840

[56] References Cited

U.S. PATENT DOCUMENTS

| | | | |
|---|---|---|---|
| 4,696,489 | 9/1987 | Fujishiro et al. | 280/707 |
| 5,289,380 | 2/1994 | Kimura | 364/424.05 |
| 5,295,705 | 3/1994 | Butsuen et al. | 280/707 |
| 5,307,907 | 5/1994 | Nakamura et al. | 188/282 |
| 5,310,027 | 5/1994 | Nakamura et al. | 188/299 |
| 5,328,202 | 7/1994 | Kakizaki | 280/707 |
| 5,383,679 | 1/1995 | Nakamura et al. | 280/707 |
| 5,425,436 | 6/1995 | Teramura et al. | 280/707 X |
| 5,467,280 | 11/1995 | Kimura | 364/424.05 |

FOREIGN PATENT DOCUMENTS

| | | |
|---|---|---|
| 0545687 | 6/1993 | European Pat. Off. . |
| 3827737 | 3/1989 | Germany . |
| 4024305 | 3/1991 | Germany . |
| 4141931 | 6/1993 | Germany . |
| 463712 | 2/1991 | Japan . |

Primary Examiner—Collin W. Park
Attorney, Agent, or Firm—Ronald P. Kananen

[57] ABSTRACT

In an apparatus and method for controlling a damping force characteristic of a vehicular shock absorber, a vertical sprung mass velocity signal $V_n$ is determined on the basis of a vertical G sensor output signal as a control signal. A control gain when a control unit changes a damping force characteristic of either an extension stroke side or a compression stroke side of a piston member of the shock absorber according to the control signal is increased as a moving average of peak values of the vertical sprung mass velocity signal $V_n$ is reduced.

15 Claims, 12 Drawing Sheets

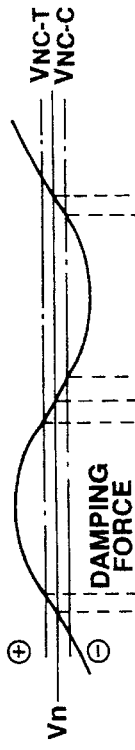
FIG.16A
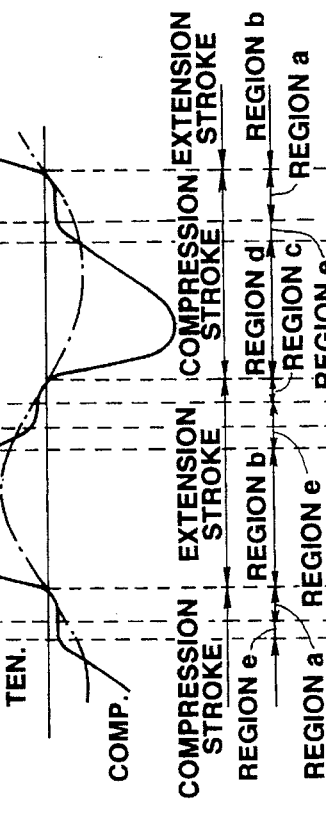
FIG.16B
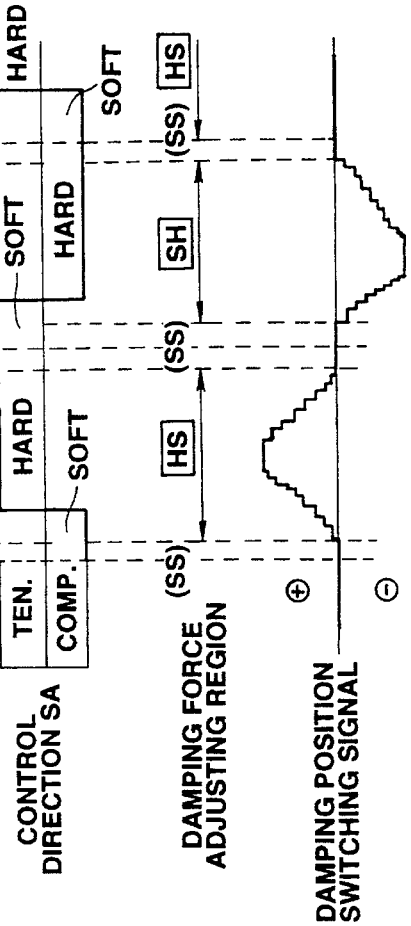
FIG.16C
FIG.16D

APPARATUS AND METHOD FOR CONTROLLING DAMPING FORCE CHARACTERISTIC OF VEHICULAR SHOCK ABSORBER

BACKGROUND OF THE INVENTION

Field of the Invention

The present invention relates to an apparatus and method for controlling damping force characteristics of four tire wheel suspension units (shock absorbers) of an automotive vehicle independently on the basis of a control signal related to a vehicular body behavior.

Description of Background Art

A Japanese Patent Application First Publication No. Heisei 4-63712 published on Feb. 28, 1992 exemplifies a previously proposed vehicular suspension (shock absorber control) system to carry out damping force characteristic controls of the respective shock absorbers, each shock absorber being interposed between a sprung mass (vehicle body) and an unsprung mass (tire wheel).

In the disclosed shock absorber control system, an extension stroke side of each shock absorber is switched in a hard (high) damping force characteristic while a compression stroke side of each shock absorber is switched in a soft damping force characteristic when a vertical sprung mass velocity is positive, i.e., (upward away from a road surface). On the other hand, the compression stroke side thereof is switched in the hard damping force characteristic and the extension stroke side thereof is switched in the soft damping force characteristic when the vertical sprung mass velocity is negative, i.e., (downward in the direction of the road surface). In this way, the damping force characteristic is switched between the two stages, i.e., hard and soft damping forces.

The same control as that based on a sky hook theory is carried out without measurement of a relative velocity between the sprung mass and unsprung mass.

Since the damping force characteristics are switched at the two stages of the hard and soft characteristics, a change in the damping force when the switching between the soft and hard characteristics is carried out is abrupt so that a high-frequency vibration occurs and this causes a harmful effect on the vehicular comfort.

Although it is possible to solve the above-described disadvantage by switching the damping force characteristics of the respective shock absorbers at multiple stages of damping force characteristics in proportion to respective values of the outstanding vertical sprung mass velocities, the following new problem occurs.

That is to say, when the damping force characteristics are continuously varied at the multiple stages, a sufficient damping force cannot be achieved since a level of each vertical sprung mass velocity signal is so small with respect to a low-frequency, small-amplitude vibration input toward the sprung mass via the unsprung mass, whereby a vibration suppression characteristic of each shock absorber is not exhibited sufficiently.

SUMMARY OF THE INVENTION

It is an object of the present invention to provide an apparatus and method for controlling a damping force of at least one vehicular shock absorber with less number of sensors which can achieve both of the vehicular comfort and steering stability by changing a control gain for the damping force characteristics of each shock absorber according to a road surface situation when the vehicle runs.

The above-described object can be achieved by providing an apparatus for controlling a damping force characteristic of a vehicular suspension system, comprising: a) at least one shock absorber which is so constructed as to be interposed between a sprung mass and an unsprung mass, said shock absorber having a damping force characteristic changing member which is so arranged as to change a damping force coefficient of either a piston extension stroke side or a piston compression stroke side according to an input drive signal thereto; b) detecting means for detecting a sprung mass vertical acceleration with respect to a direction of gravity; c) deriving means for deriving a vertical sprung mass velocity on the basis of the vertical sprung mass acceleration detected by the detecting means and for controlling the damping force characteristic of the shock absorber on the basis of a magnitude and direction of the derived vertical sprung mass velocity via said drive signal input to said damping force characteristic changing member of said shock absorber; and d) calculating means for sampling and holding a plurality of peak values of said derived vertical sprung mass velocity with respect to time, for calculating a moving average of the plurality of sampled and held peak values, and adjusting a control gain for the drive signal with respect to the derived vertical sprung mass velocity set when the damping force characteristic changing member changes the damping force characteristic of the shock absorber according to the drive signal input thereto, said control gain being increased as the calculated moving average becomes decreased.

The above-described object can also be achieved by providing an apparatus for controlling damping force characteristics of vehicular shock absorbers, said shock absorbers being interposed between a sprung mass of a vehicle body and an unsprung mass of corresponding tire wheels, respectively, said apparatus comprising: a) damping force characteristic varying means for varying damping force characteristics of either an extension piston stroke side or a compression piston stroke side of the respective shock absorbers according to input control signals thereto; b) vertical sprung mass acceleration sensing means for detecting vertical sprung mass accelerations located adjacent to the shock absorbers and outputting vertical sprung mass acceleration signals indicative thereof; c) vertical sprung mass velocity determining means for determining vertical sprung mass velocities on the basis of the detected vertical sprung mass acceleration signals and determining the change in the damping force characteristics of the respective shock absorbers so as to output the control signals based on directions and magnitudes of the respectively determined vertical sprung mass velocities; d) deriving means for sampling a plurality of peak values of the determined vertical sprung mass velocities and holding them therein, for deriving moving averages from the sampled and held plurality of peak values for the respective shock absorbers and for setting control gains for the drive signals with respect to the vertical sprung mass velocities when the damping force characteristics of either the extension or compression strokes of the pistons of the respective shock absorbers are changed according to the control signal, said control gains being set such that as each one of the derived moving averages becomes smaller, the corresponding one of the control gains for each one of the shock absorbers becomes larger.

The above-described object can also be achieved by providing a method for controlling a damping force characteristic of a vehicular suspension, comprising the steps of: a) detecting a sprung mass vertical acceleration with respect to a direction of gravity; b) deriving a vertical sprung mass velocity on the basis of the detected vertical sprung mass acceleration; c) controlling the damping force characteristic of the shock absorber on the basis of a magnitude and direction of the derived vertical sprung mass velocity via said drive signal input to a damping force characteristic changing member of said shock absorber; and d) sampling and holding a plurality of peak values with respect to a time of said derived vertical sprung mass velocity, calculating a moving average of the plurality of sampled and held peak values, and adjusting a control gain for the drive signal of the derived vertical sprung mass velocity set when the damping force characteristic changing member changes the damping force characteristic of the shock absorber according to the drive signal input thereto, said control gain being increased as the calculated moving average becomes decreased.

When the vehicle runs on an even paved road surface, the vertical sprung mass velocity is small. Therefore, the control signal based on the vertical sprung mass velocity is such as to provide a low-frequency, small-amplitude signal. When the control signal becomes the low-frequency small-amplitude signal, each peak value held in the memory to be calculated in a control unit becomes accordingly small so that its moving average value becomes small and accordingly the control gain becomes high.

Hence, since the control gain with respect to the vertical sprung mass velocity becomes high, the damping force characteristic is so controlled as to provide a higher value. Thus, a sufficient vibration suppression characteristic is achieved and a steering stability can be assured.

On the other hand, when the vehicle runs on an unpaved rough road surface, since the vertical sprung mass velocity signal has a high-frequency, large-amplitude signal, each peak value of the unsprung mass vertical velocity signal becomes large and the moving average value becomes large so that the control gain is reduced. Hence, the control gain for the vertical sprung mass velocity signal becomes reduced and accordingly the damping force characteristic becomes softer. Thus, an unsprung mass vibration input transmitted toward the sprung mass is suppressed so that the vehicular comfort when running on the unpaved rough road surface can be assured.

BRIEF DESCRIPTION OF THE DRAWINGS

FIGS. 16A, 16B, 16C, and 16D are integral waveform charts for explaining a control gain variable setting operation in the embodiment shown in FIG. 2.

BEST MODE CARRYING OUT THE INVENTION

Reference will hereinafter be made to the drawings in order to facilitate a better understanding of the present invention.

First Embodiment

Figure 1:
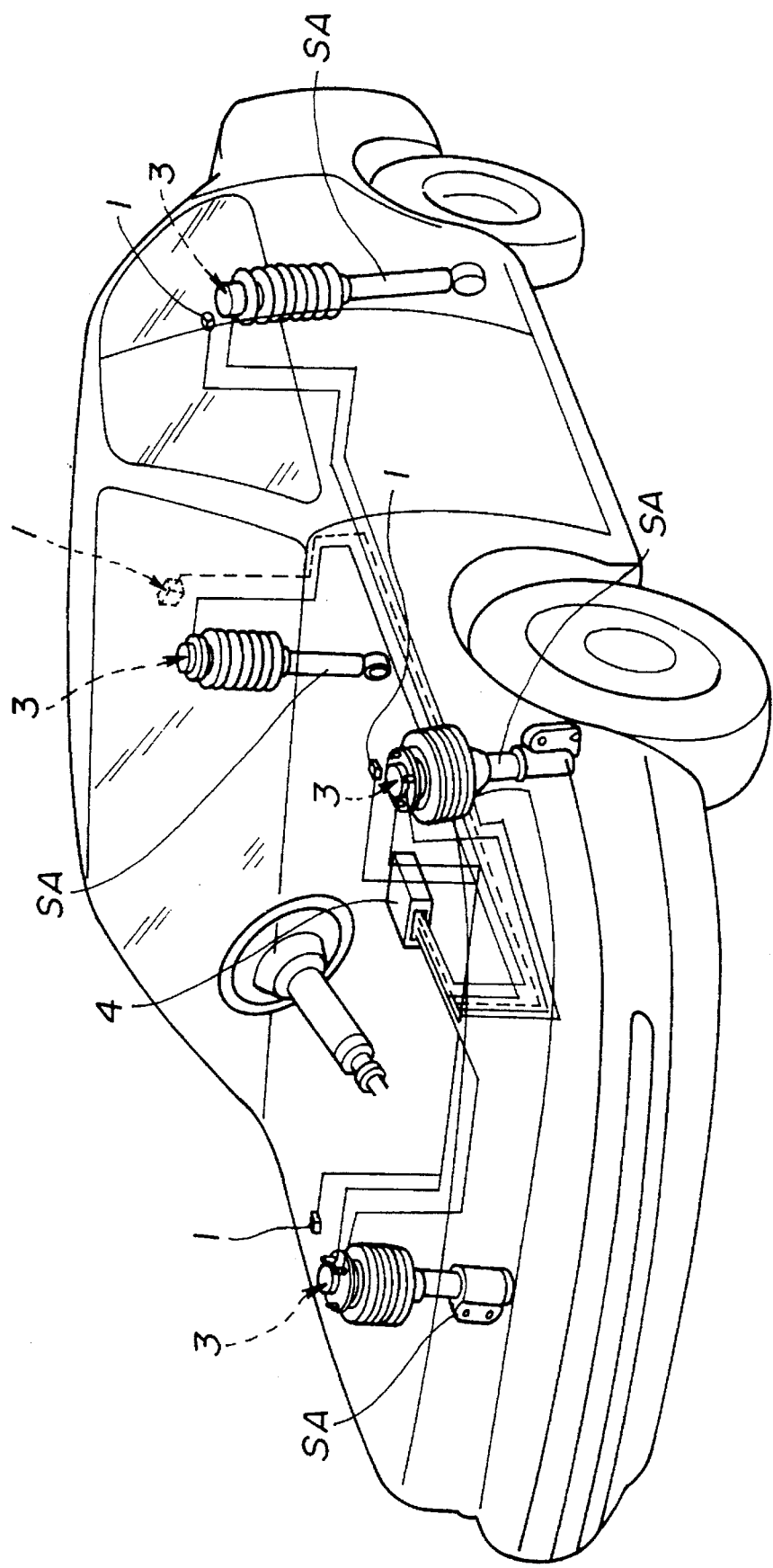
FIG. 1 is an explanatory perspective view of an automotive vehicle in which an apparatus for controlling damping forces of vehicular shock absorbers in a first preferred embodiment is mounted.

FIG. 1 shows a whole system configuration of a vehicular shock absorber damping force characteristic controlling apparatus in a first preferred embodiment according to the present invention.

Four shock absorbers $SA_1$, $SA_2$, $SA_3$, and $SA_4$ (it is noted that a representative shock absorber is simply denoted by SA) are interposed between parts of a vehicle body (sprung mass) and respective tire wheels (unsprung mass). The tire wheels comprise a front left tire wheel, a front right tire wheel, a rear left tire wheel, and a rear right tire wheel of the vehicle.

At parts of the vehicle body, all shock absorbers SA ($SA_1$ through $SA_4$) are mounted thereon and in the proximities of the parts of the vehicle body, vertical sprung mass (vehicle body) acceleration sensors (also called sprung mass G (gravity) sensors) $1_1$, $1_2$, $1_3$ and $1_4$ (hereinafter, one representative sprung mass vertical acceleration sensor is simply denoted by 1) are disposed so as to detect the vertical sprung mass (vehicular height direction) accelerations, i.e., vehicle behaviors related to the vertical velocities of the sprung mass.

A control unit 4 is installed, in response to sensor signals from the respective G sensors 1, and functions to output a control signal to each pulse (stepping) motor 3 associated with the representative shock absorber SA. A function of each one of the pulse (stepping) motors 3 will be described later.

Figure 2:
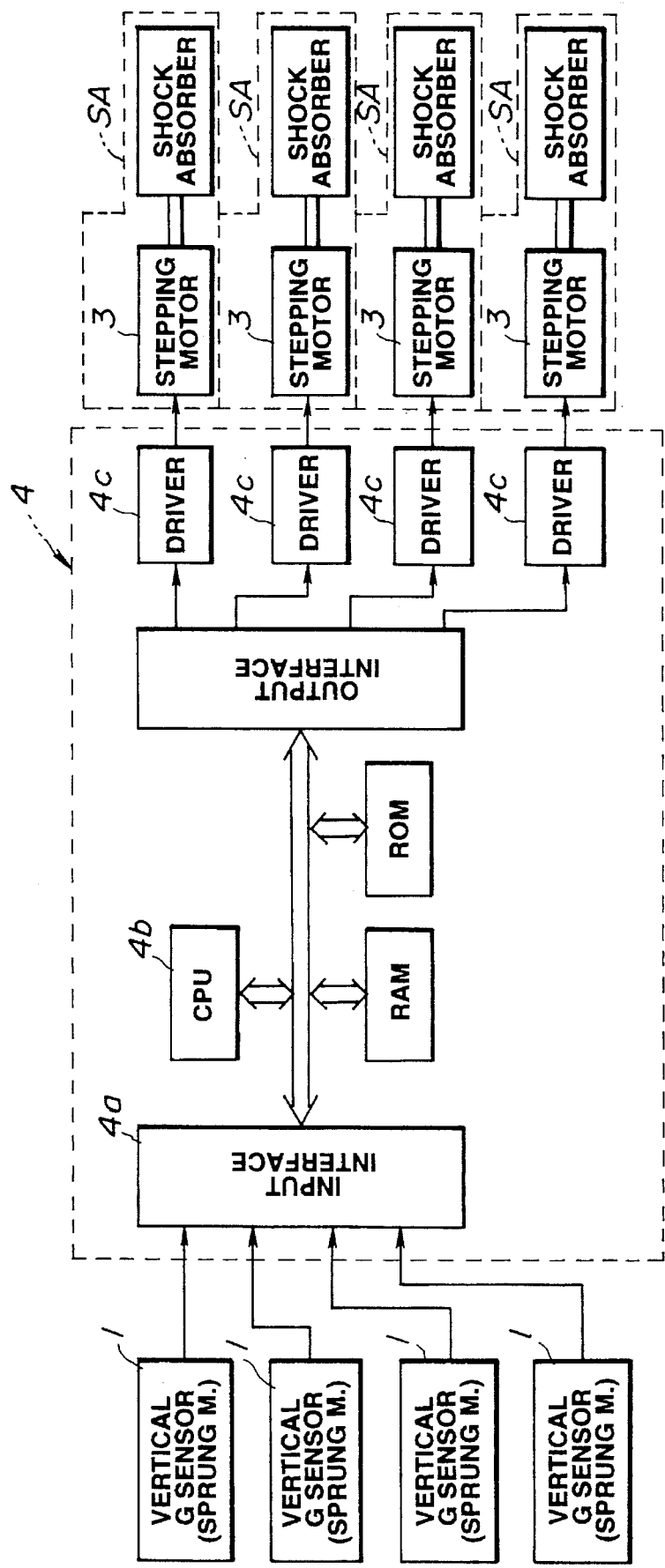
FIG. 2 is a circuit block diagram of the shock absorber damping force controlling apparatus in the first preferred embodiment.

FIG. 2 shows a system circuit block diagram of the vehicular shock absorber damping force controlling apparatus in the first embodiment.

The control unit 4 includes an input interface circuit 4a, CPU (Central Processing Unit) 4b, four drivers 4c, common bus, a memory (ROM and RAM), and output interface. The input interface circuit 4a receives sensor signals from the respective vertical sprung mass acceleration sensors 1.

Figure 3:
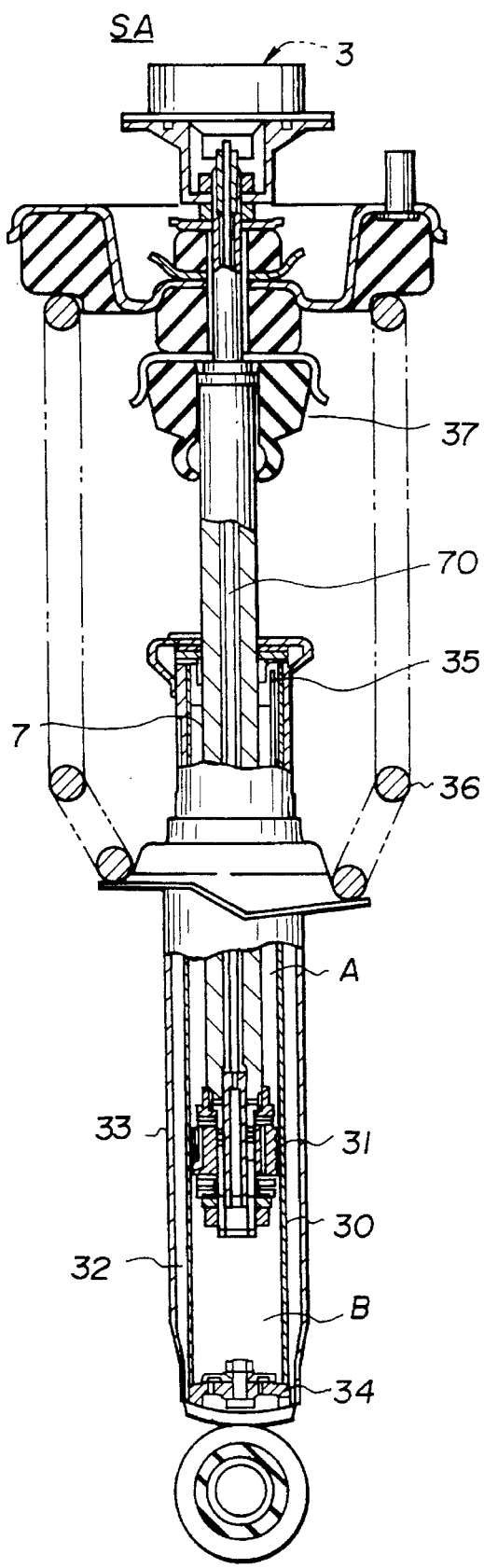
FIG. 3 is a partial sectional view of the representative shock absorber SA used in the first embodiment shown in FIGS. 1 and 2.

Next, FIG. 3 show cross sectional views of each representative shock absorber SA.

The shock absorber SA, as shown in FIG. 3, includes: a cylinder 30, a piston 31 defining an upper portion chamber A and a lower portion chamber B; an outer envelope 33 in which a reservoir chamber 32 is formed on an outer peripheral end of the cylinder 30; a base 34 which defines the lower chamber B and the reservoir chamber 32; a guide member 35 which guides a sliding motion of a piston rod 7 with the other end of which a piston 31 is linked; a suspension spring 36 interposed between the outer envelope 33 and vehicle body; and a bumper rubber 37. Each stepping motor 3 is installed in an upper position of the shock absorber SA so as to operatively rotate an adjuster 40 (FIG. 4) via a control rod 70 in response to a drive signal from the corresponding one of the drivers 4c.

Figure 4:
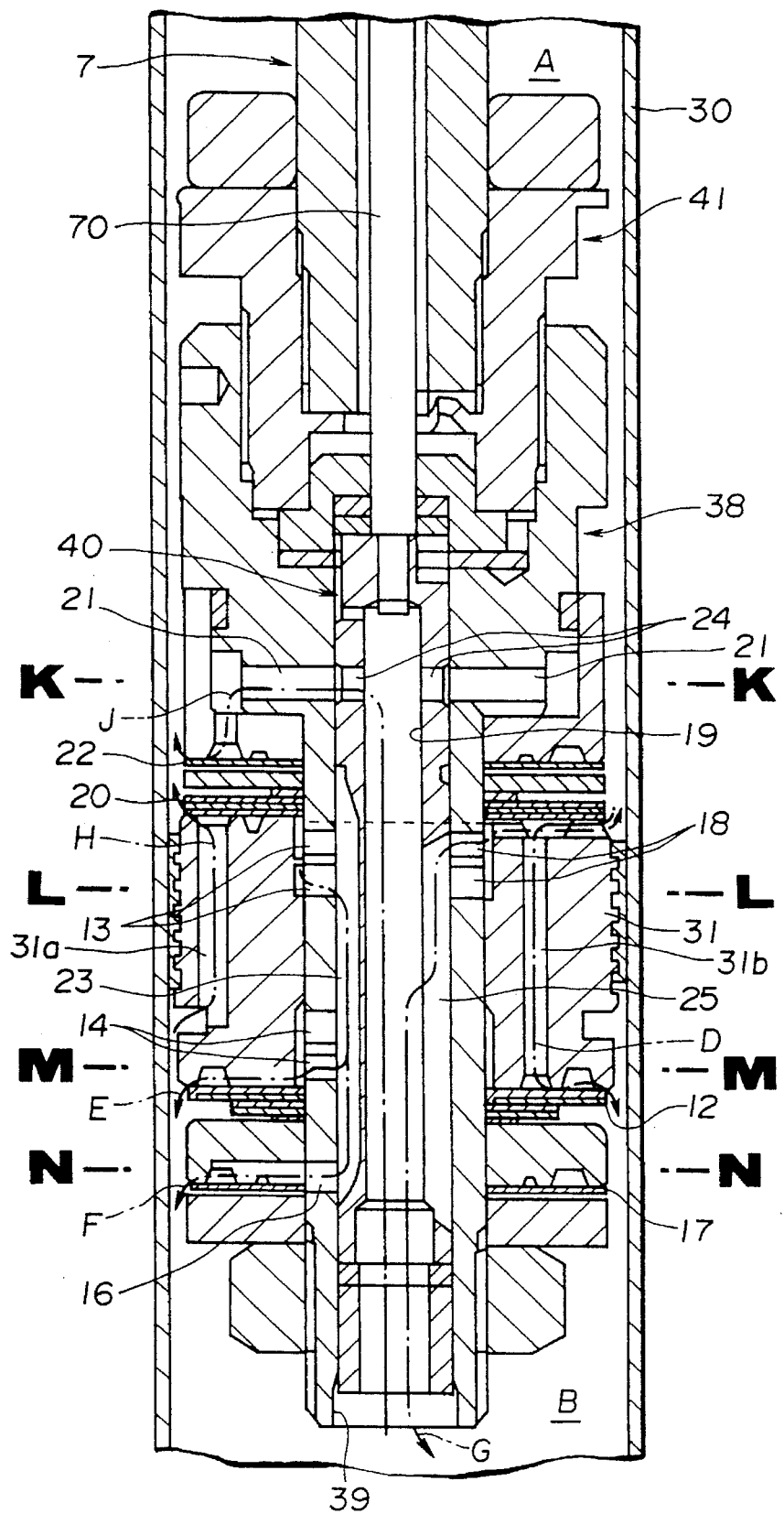
FIG. 4 is an enlarged, partial sectional view of the representative shock absorber SA shown in FIG. 3.

FIG. 4 shows an enlarged cross sectional view representing a part of the piston assembly 31 of the respective shock absorbers SA.

As shown in FIG. 4, the piston 31 is formed with penetrating holes 31a and 31b. In addition, the piston 31 is provided with a compression stroke side attenuation valve 20 and an extension stroke side attenuating valve 12 respectively opening and closing the respective penetrating holes 31a and 31b. A stud 38 is spirally meshed with and fixed to a bound stopper 41 spirally meshed with and fixed to a tip end of the piston rod 7. The stud 38 is penetrated through the piston 31. In addition, the stud 38 is formed with a communication hole 39 which communicates the upper portion chamber A and the lower portion chamber B. Furthermore, an adjuster 40 which changes a flow passage cross sectional area of the communication hole 39 is provided in the piston assembly.

Furthermore, an extension stroke side check valve 17 and a compression stroke side check valve 22 are also installed which enable and disable the fluid flow through the communication hole 39 in accordance with the direction of the flow of the fluid. It is noted that the adjuster 40 is rotated via a control rod 70 by means of the pulse (stepping) motor 3 (referring back to FIG. 3).

It is noted that the stud 38 is formed with a first port 21, a second port 13, a third port 18, a fourth port 14, and fifth port 16, respectively in an upper order.

On the other hand, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and lower portion chamber B as the fluid flow passages at the piston extension stroke: that is to say, 1) an extension stroke side first flow passage D such that the fluid passes the penetrating hole 31b, a valve opened internal side of the extension stroke side attenuation valve 12, and reaches the lower portion chamber B; 2) an extension stroke side second flow passage E in which the fluid flows through the second port 13, the longitudinal groove 23, the fourth port 14, a valve opened outer peripheral side of the extension stroke side attenuating valve 12, and reaches the lower portion chamber B; an extension stroke side third flow passage F in which the fluid passes through the second port 13, the longitudinal groove 23, and the fifth port 16; and a bypass flow passage G in which the fluid passes through the third port 18, the second lateral hole 25, and the hollow portion 19 and reaches the lower portion chamber B.

In addition, the fluid flow passage through which the fluid can be caused to flow during the compression stroke side of the piston 31 includes: 1) a compression stroke side first flow passage H in which the fluid flows through the penetrating hole 31a and valve opened compression stroke side attenuating valve 20; 2) a compression stroke side second flow passage J in which the hollow portion 19, the first lateral hole 24, the first port 21, and the opened compression stroke side check valve 22 and reaches the upper portion chamber A; and a bypass passage G in which the fluid flows through the hollow portion 19, the second lateral hole 25, and the third port 18.

Figure 5:
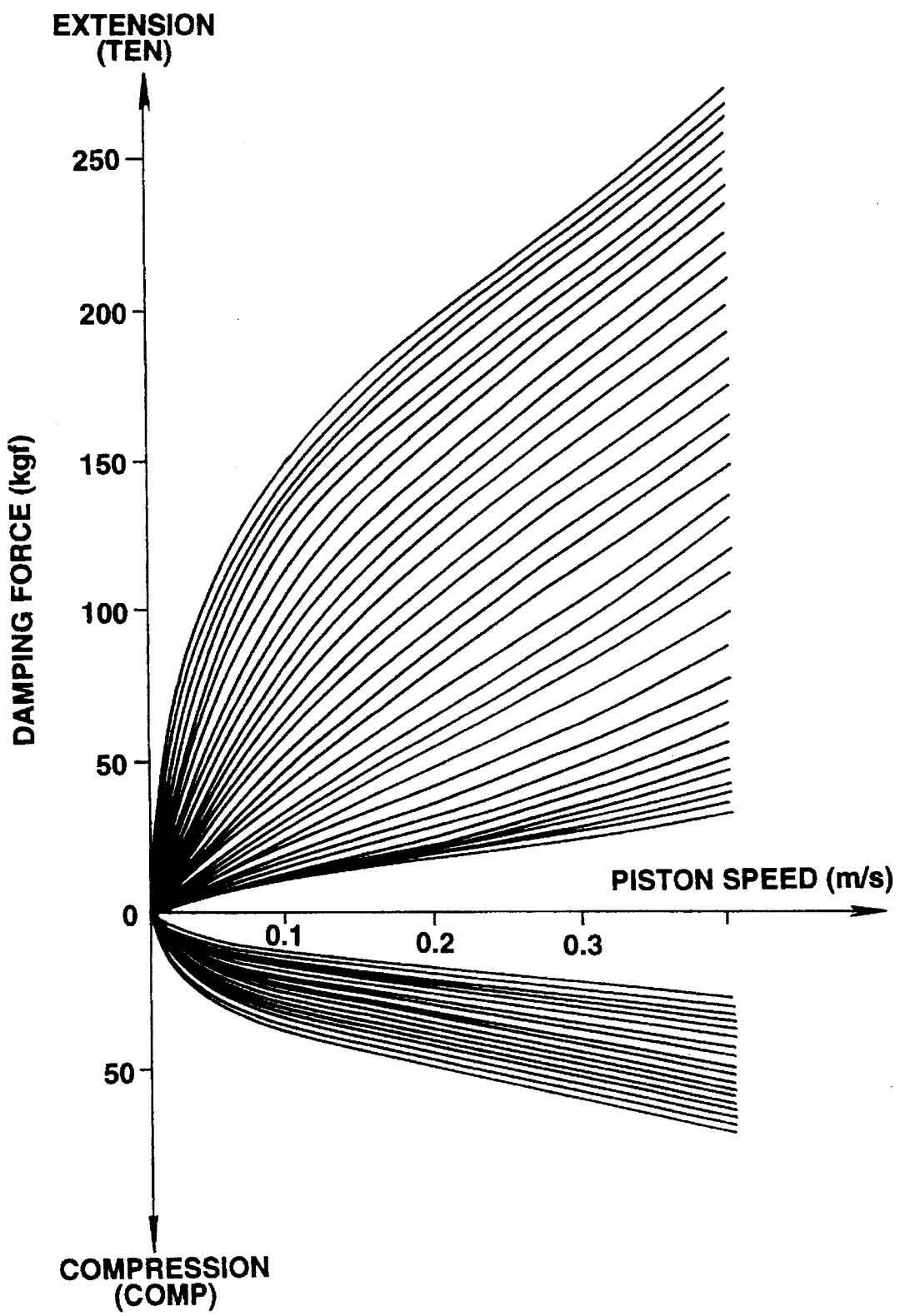
FIG. 5 is a characteristic graph representing damping forces with respect to a piston speed of the representative shock absorber shown in FIGS. 3 and 4.

In summary, the shock absorber SA is so constructed as to be enabled to change the damping force characteristics at a multiple stage in its damping characteristic as shown in FIG. 5 either in the extension stroke side or compression stroke side when the adjuster 40 is pivoted according to the rotation of the stepping motor 3.

It is noted that, as shown in FIG. 5, the terminology of "damping coefficient" is used since the damping force characteristic with respect to the piston speed is changed with its gradients being varied.

Figure 6:
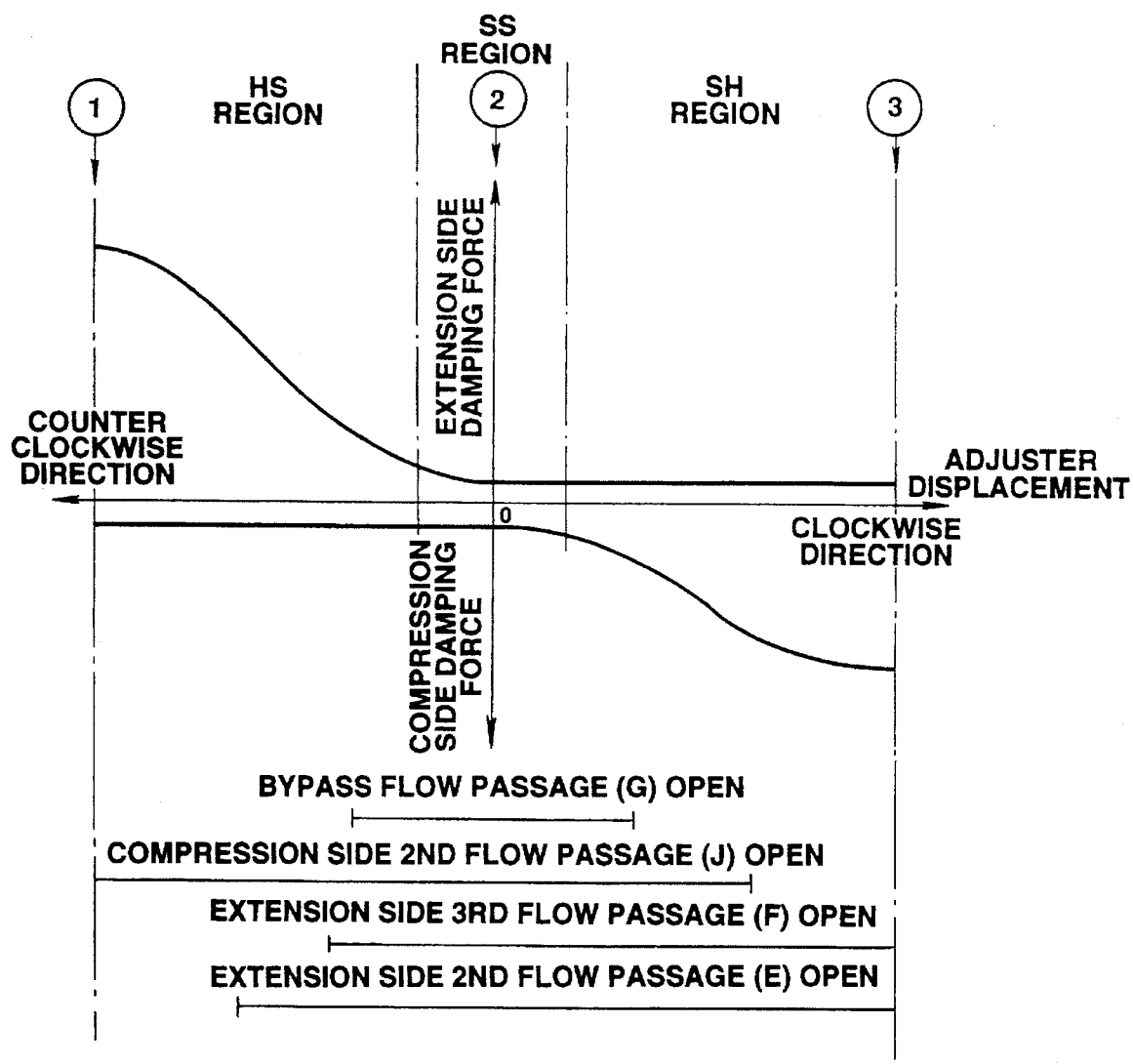
FIG. 6 is a damping coefficient characteristic graph corresponding to a stepped position of a representative pulse (stepping) motor shown in FIG. 2.
Figure 7A:
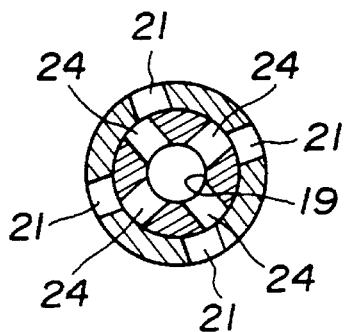
FIGS. 7A, 7B, and 7C are cross sectional views cut away along a line K—K of FIG. 4 representing an essential part of the representative shock absorber SA shown in FIG. 3.
Figure 7B:
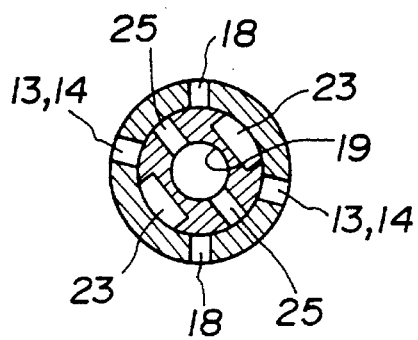
Figure 7C:
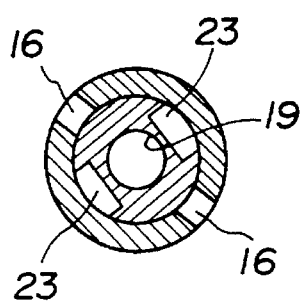
Figure 8A:
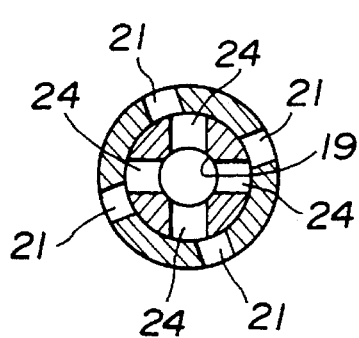
FIGS. 8A, 8B, and 8C are cross sectional views cut away along lines L—L and M—M of FIG. 4 representing an essential part of the representative shock absorber SA shown in FIG. 3.
Figure 8B:
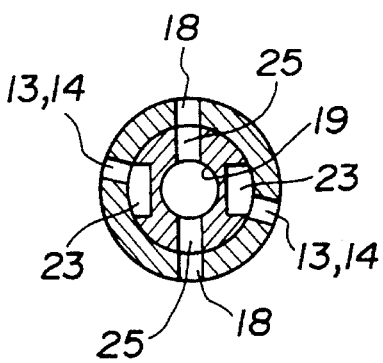
Figure 8C:
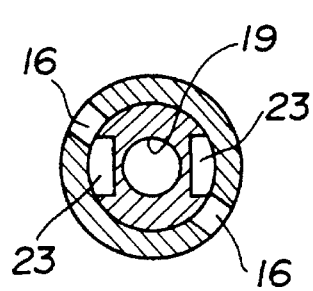
Figure 9A:
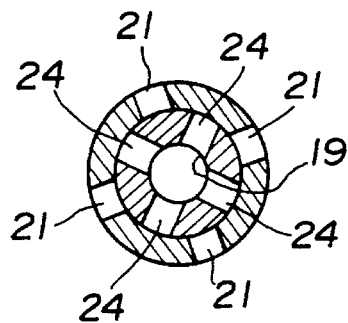
FIGS. 9A, 9B, and 9C are cross sectional views cut away along a line N—N of FIG. 4 representing an essential part of the representative shock absorber SA shown in FIGS. 3 and 4.
Figure 9B:
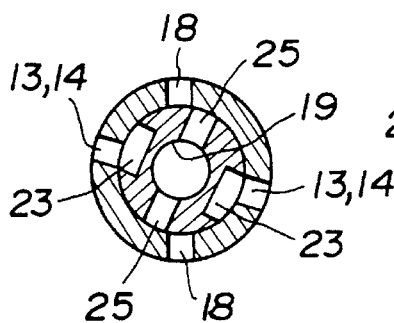
Figure 9C:
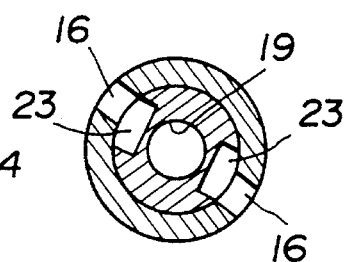

In details, as shown in FIG. 6, when the adjuster 40 is pivoted in the counterclockwise direction from a position at which both of the extension and compression stroke sides are in the soft positions (hereinafter referred to as a soft position SS) shown in FIG. 6, the damping coefficient at the extension stroke side can be changed at the multiple stages but the compression stroke side is fixed at the soft region (hereinafter referred to as an extension stroke side hard region HS). On the contrary, when the adjuster 40 is pivoted in the clockwise direction therefrom, the damping coefficient at the compression stroke region is only changeable to the hard region at the multiple stages and that in the compression stroke side is fixed to the soft region (hereinafter, referred to as a compression hard region SH).

Figure 10:
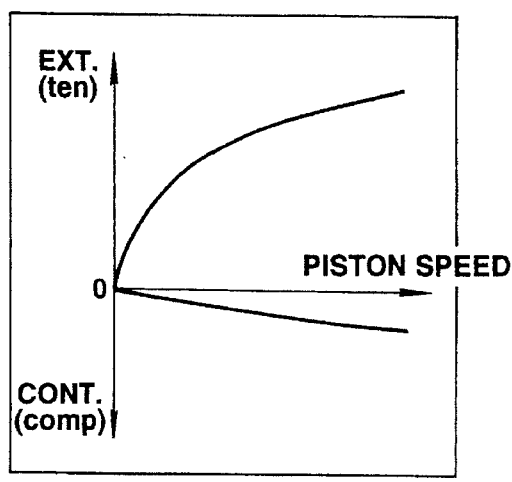
FIG. 10 is a damping force characteristic graph when an extension stroke side with respect to the piston of the representative shock absorber SA shown in FIGS. 3 and 4. are in a soft damping state.
Figure 11:
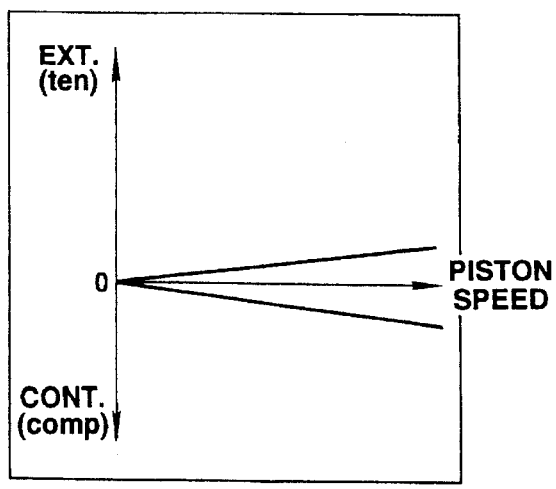
FIG. 11 is a damping force characteristic graph when both extension and compression stroke sides are in soft damping force states.
Figure 12:
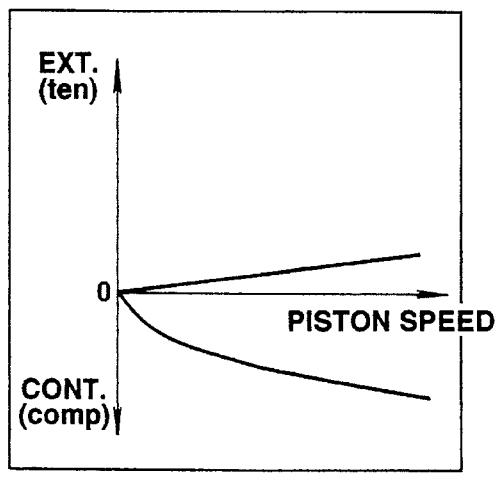
FIG. 12 is a damping force characteristic graph when the compression stroke side is in a hard damping force state.

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS. 7A, 7B, 7C, 8A, 8B, 8C, 9A, 9B, and 9C, respectively. The damping force characteristics at the respective positions ①, ②, and ③ are shown in FIGS. 10, 11, and 12.

Operation of the First Preferred Embodiment

Figure 13:
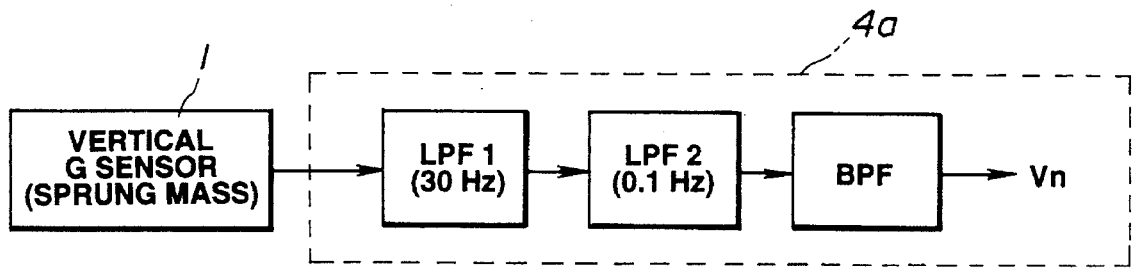
FIG. 13 is a signal processing circuit representing a signal processing process in an input interface circuit of a control unit in the first embodiment shown in FIG. 2 to derive a vertical sprung mass velocity signal $V_n$.

Next, the detailed description of the control unit 4 shown in FIG. 2 will be described with reference to FIGS. 13, 14, and 15.

Figure 14:
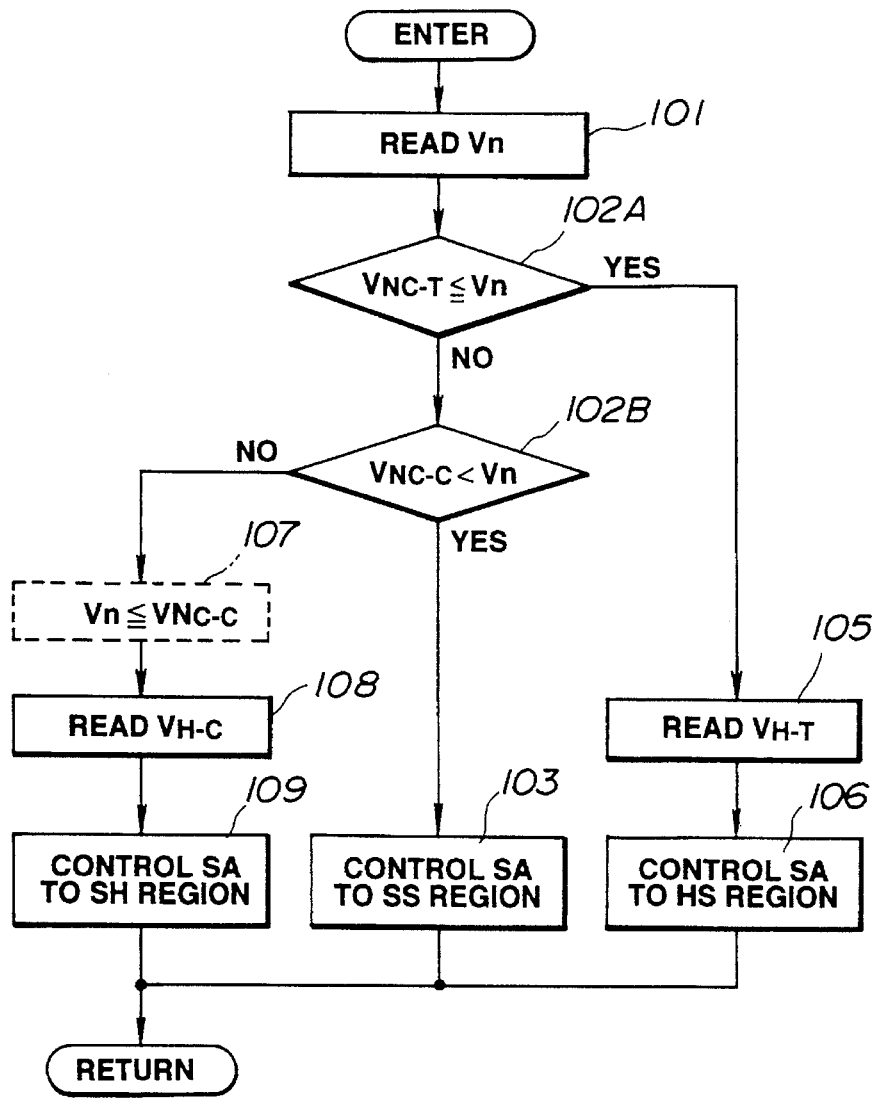
FIG. 14 is an operational flow chart executed by the control unit shown in FIG. 2.

Such a control procedure shown in FIG. 14 is executed independently of each shock absorber SA.

At a step 101 shown in FIG. 14, the CPU 4b reads the vertical sprung mass velocity signal $V_n$(control signal) as a bouncing component of the sprung mass in the proximity to each tire wheel. The vertical sprung mass velocity signal $V_n$ is, as shown in FIG. 13, derived from the sprung mass vertical acceleration signal of the corresponding one of the sprung mass G sensor 1 through a plurality of filters, LPF 1 (Low Pass Filter 1) which passes only the frequency component below 30 HZ, LPF 2 (Low Pass Filter 2) which serves to integrate the frequency component passed through the LPF 1 to derive the vertical sprung mass velocity signal, and BPF (Band Pass Filter). The vertical sprung mass velocity signal $V_n$ is positive when a direction of the vertical sprung mass acceleration is vertically upward and negative when the direction of the vertical sprung mass acceleration is downward.

Figure 15:
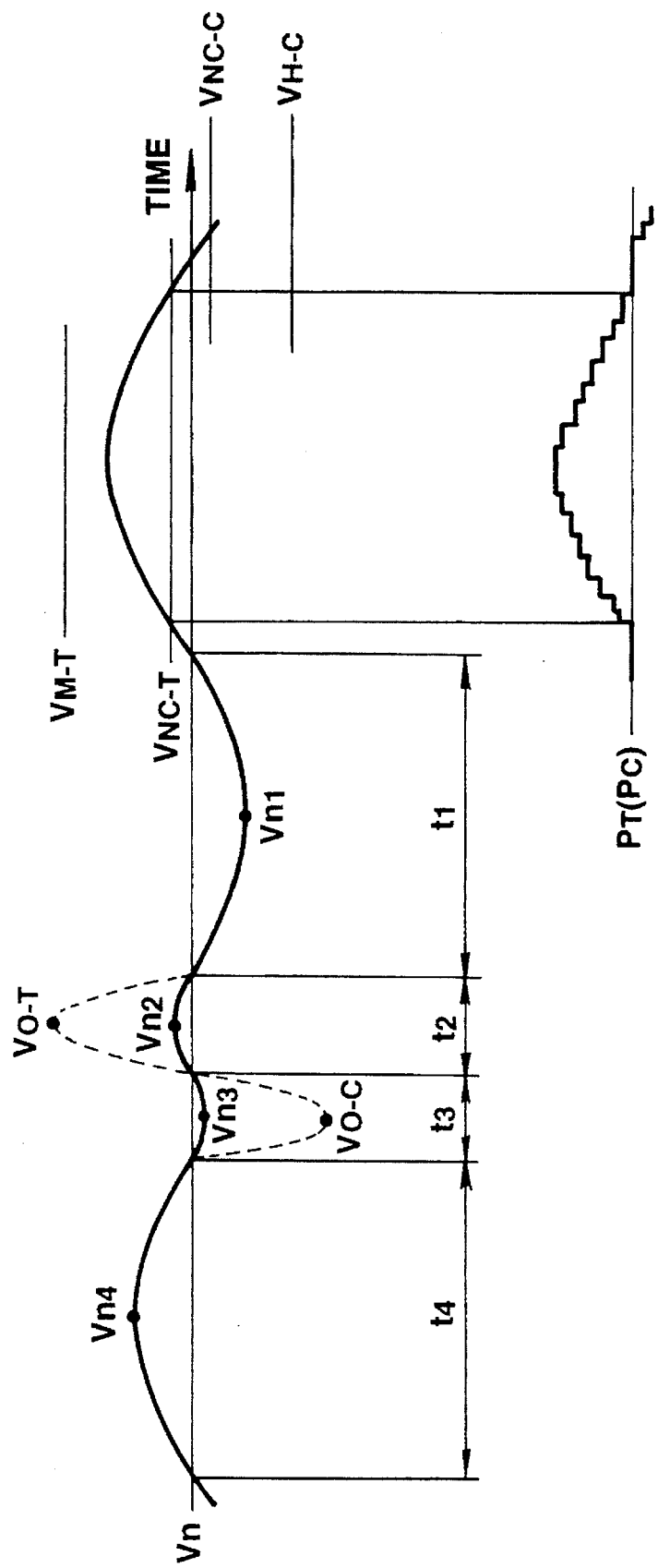
FIG. 15 is a signal waveform chart for explaining a control operation of the control unit shown in FIG. 2.

At a step 102A, the CPU 4b determines whether the vertical sprung mass velocity signal value $V_n$ is equal to or above a first predetermined threshold value of a positive side $V_{NC-T}$ defining a predetermined dead zone (dead zone means an insensitivity zone) shown in FIG. 15. If No at the step 102A, the CPU 4b at a 102B determines whether the vertical sprung mass velocity signal $V_n$ is above a second predetermined threshold value of a negative side $V_{NC-C}$. If Yes at the step 102A, since the vertical sprung mass velocity signal falls in the range from $V_{NC-T}$ to $V_{NC-C}$, the routine goes to a step 103 in which the corresponding shock absorber SA is controlled in a soft damping coefficient range of SS in which both extension stroke and compression stroke regions of the piston are in tile relatively soft damping force characteristics. If Yes at the step 102A, since $V_n \geq V_{NC-T}$, the routine goes to a step 105. If No at the step 102B, the routine goes to a step 107.

At the step 105, the CPU derives an extension stroke side proportional range $V_{H-T}$ according to the following equation.

$$V_{H-T} = \eta_T \cdot (K_1 \cdot V_{n1} + K_2 \cdot V_{n2} + \cdots + K_n \cdot V_{nn})/(K_1 + K_2 + \cdots K_n).$$

In the above equation, $\eta_T$ denotes an extension stroke side proportional range adjustment coefficient, $V_{n1}, V_{n2}, \cdots, V_{nn}$ denotes each peak value for every half period of the vertical sprung mass velocity signal $V_n$, each subscript of numerals 1 through n denotes an integer such that as the numerical value becomes greater, the past (older) data of the peak values, $K_1, K_2, \cdots, K_n$ denote extension stroke side weight coefficients, and their subscripts correspond to the peak values $V_{n1}, V_{n2}, \cdots, V_{nn}$ of the respective vertical sprung mass velocity signals $V_n$.

That is to say, the extension stroke side proportional range $V_{H-T}$ correspond to the vertical sprung mass velocity signal $v_n$ which corresponds to a maximum damping force characteristic position $P_{max-T}$ at the extension stroke side (a position at ① of FIG. 6). The proportional range $V_{H-T}$ is derived on the basis of a moving average value of the past four peak values $V_{nn}(V_{n1}, V_{n2}, V_{n3},$ and $V_{n4})$.

At a step 106, the shock absorber SA is placed at an extension stroke side hard characteristic mode and the extension stroke side damping force characteristic position $P_T$ (damping coefficient) is derived on the basis of the following equation and the control unit 4 drives the corresponding one of the drivers 4c to actuate the stepping motor 3 so as to place the adjuster 40 of the shock absorber SA in the position $P_T$.

$$P_T = P_{max-T} \cdot (V_n - V_{NC-T})/(V_{H-T} - V_{NCT}).$$

That is to say, as the extension stroke side proportional range $V_{H-T}$ becomes large, the control gain becomes reduced. On the other hand, as the extension stroke side proportional range $V_{H-T}$ becomes smaller, the control gain gets higher. Since the extension stroke side proportional range $V_{H-T}$ is made proportional to the moving average of the respective peak values $V_{nn}$ of the sprung mass vertical velocity $V_n$, the waveform amplitude (peak value) of the vertical sprung mass velocity $V_n$ is small, the control gain is set to a higher value. Conversely, if the waveform amplitude becomes large, the control gain can be reduced.

At the step 107, since the outstanding vertical sprung mass velocity $V_n$ is below the negative threshold value $V_{NC-C}$ of the dead zone, the routine goes to a step 108.

At the step 108, a compression stroke side proportional range $V_{H-C}$ is derived as expressed below:

$$V_{H-C} = \eta_C \cdot (K_1 \cdot V_{n1} + K_2 \cdot V_{n2} + \cdots + K_n \cdot V_{nn})/(K_1 + K_2 + \cdots + K_n).$$

$\eta_C$ denotes a compression stroke side proportional range adjustment coefficient. $V_{n1}, V_{n2}, \cdots, V_{nn}$ denote the peak values. $K_1, K_2, \cdots, K_n$ denote compression stroke side weight coefficients whose subscripts correspond to the peak values $V_{nn}$ $(V_{n1}, V_{n2}, \cdots, V_{nn})$.

That is to say, the compression stroke side proportional range $V_{H-C}$ indicates the vertical sprung mass velocity $V_n$ corresponding to the compression stroke side maximum damping force characteristic position $P_{max-C}$ (refer to ③ in FIG. 6) and is derived on the basis of the moving average of the past four peak values $V_{nn}$ $(V_{n1}, V_{n2}, \cdots, V_{n4})$.

At a step 109, the CPU 4b switches the shock absorber SA in a compression stroke side hard characteristic SH and drives the stepping motor 3 via the driver to position $P_C$ (damping coefficient) of the adjuster at the compression stroke side characteristic on the basis of the following equation.

$$P_C = P_{max-C} \cdot (|V_n| - |V_{NC-C}|)/(|V_{H-C}| - |V_{NC-C}|).$$

That is to say, if the above-described compression stroke side proportional range $V_{H-C}$ becomes large, the control gain is reduced. On the other hand, if the compression stroke side $V_{H-C}$ becomes small, the control gain becomes high. The compression stroke side proportional range $V_{H-C}$ is made proportional to the moving average value of each peak value $V_{nm}$ of the vertical sprung mass velocity $V_n$. If the waveform amplitude (peak value) of the vertical sprung mass velocity $V_n$ is so small, the control gain is increased. Conversely, if the waveform amplitude becomes large, the control gain becomes reduced.

Next, an operation of the control unit 4 for variably setting the control gain in the first embodiment will be described below.

(1) The vehicle runs on a paved road (even road surface):

When the vehicle runs on a paved road (even or flat road surface), the vertical sprung mass velocity signal is such as to provide a low frequency, small amplitude signal and, therefore, the moving average value of its peak values $V_{nm}$ is accordingly reduced. Hence, the proportional ranges $V_{H-T}$ and $V_{H-C}$ are accordingly reduced, but the control grain is set higher. Thus, the damping force characteristic positions $P_T$ and $P_C$ are controlled to be higher damping force characteristics with respect to the vertical sprung mass velocity $V_n$. Consequently, even if the vehicle runs on the paved road surface (even or flat road surface) such that the vertical sprung mass velocity is such as to provide the low frequency, small amplitude signal, a sufficient suppression of vibrations from the road surface can be achieved and the steering stability can be assured.

It is noted that if a large impulsive input from the road surface on which the vehicle runs due to the passage of the vehicle on a road joint portion and/or projection portion occurs, a large variation of the moving average value of the respective peak values $V_{nm}$ does not occur. Therefore, such a situation that the control gain is abruptly reduced due to the large impulsive input and that the damping force characteristic is accordingly reduced cannot be found. Thus, the steering stability can be assured.

(2) The vehicle runs on a rough road (unpaved road):

When the vehicle runs on the rough road surface, the vertical sprung mass velocity signal $V_n$ tends to provide a high frequency, large amplitude signal so that the moving average of the peak values $V_{nm}$ becomes accordingly increased. Hence, the proportional ranges of $V_{H-T}$ and $V_{H-C}$ are Large and the control gain is accordingly reduced. In addition, as compared with the situation wherein the vehicle runs on the paved road surface described above, the damping force characteristic positions $P_T$ and $P_C$ are so controlled as to provide the lower damping force characteristics. Thus, the transmission of the vibration input of the unsprung mass to the sprung mass is suppressed so that the vehicular comfort can be assured during the vehicle run on the rough road surface.

FIGS. 16A through 16D show integrally the waveform timing chart of each part of the suspension control system shown in FIG. 1.

Suppose that the vertical sprung mass velocity signal $V_n$ is changed as in the waveform shown in FIG. 16A.

As shown in FIG. 16C, when the vertical sprung mass velocity signal $V_n$ falls in the dead zone between $V_{NC-T}$ and $V_{NC-C}$, the shock absorber SA is controlled in the range of the soft characteristic SS (region e of FIG. 16B).

When the vertical sprung mass velocity signal $V_n$ exceeds the positive threshold value $V_{NC-T}$ of the dead zone, the position of the adjuster 40 is changed within the region of extension stroke side hard characteristic HS and the compression stroke side is fixed to the maximum damping force coefficient.

On the other hand, if the vertical sprung mass velocity signal $V_n$ is below the negative threshold value $V_{NC-C}$ of the dead zone, the position of the adjuster 40 is changed within the region of the compression stroke side hard characteristic SH and the extension stroke side is fixed at the minimum damping force coefficient.

In FIG. 16B, in a region a, the vertical sprung mass velocity signal $V_n$ is reversed from the downward (negative) direction to the upward (positive) direction, the relative velocity (between the sprung mass and unsprung mass) is still at the negative value as shown in FIG. 16B. In the sky hook theory, the compression stroke side is switched to the low damping coefficient side. At this time, the shock absorber SA is controlled to fall in the position to provide the extension stroke side hard characteristic HS on the basis of the direction of the vertical sprung mass velocity signal $V_n$. The compression stroke side as the stroke direction of the shock absorber SA is placed at the minimum damping coefficient as the sky hook theory.

A region b shown in FIG. 16B is a region in which the vertical sprung mass velocity signal $V_n$ is positive (upward) and the relative velocity is switched from the negative direction to the positive direction (stroke direction of the shock absorber SA is the extension stroke side), i.e., a region in which the shock absorber SA is changed to the extension stroke side, the sky hook theory teaches that the extension stroke side is switched to the high damping force characteristic. At this time, in the first embodiment, the shock absorber SA is positioned at the extension stroke side HS on the basis of the vertical sprung mass velocity $V_n$. As the sky hook theory teaches, the extension stroke side of the stroke direction of the shock absorber SA is controlled to provide the high damping force coefficient without change in the control region of the position.

A region c is a region in which the vertical sprung mass velocity signal $V_n$ is reversed from the positive (upward) direction to the negative (downward) direction and the relative velocity is still positive so that the stroke direction of the shock absorber SA is the extension stroke side. The sky hook theory teaches that at this time the extension stroke side is controlled to provide the low damping force coefficient.

In the first embodiment, the shock absorber SA is controlled in the position within the compression stroke side hard characteristic SH. The extension stroke side, the stroke direction of the shock absorber SA, gives the minimum damping coefficient as the sky hook theory teaches.

A region d is a region in which the vertical sprung mass velocity $V_n$ is still negative (downward), the relative velocity is changed from the positive to the negative. The shock absorber SA is in the compression stroke. The sky hook theory teaches that the compression stroke side is controlled to provide the high damping force coefficient. In the first embodiment, the shock absorber SA is controlled to the position within the region of the compression stroke side hard characteristic SH on the basis of the direction of the vertical sprung mass velocity $V_n$. The compression stroke, the stroke direction of the shock absorber SA, is controlled to provide the high damping force coefficient as the sky hook theory teaches.

As described above, when a directional sign of the vertical sprung mass velocity and a directional sign of the relative velocity between the sprung and unsprung mass are the same (regions b and d), the present stroke direction of the shock absorber SA is controlled at the soft characteristic. The same control as the sky hook theory can be carried out without detection of the relative velocity between the sprung and unsprung mass.

Furthermore, in the first embodiment, the switching between tile damping force characteristics can be carried out without actuation of the stepping motor 3 when the region is transferred from the region a to the region b and from the region c to the region d.

The following advantages can be achieved from the first embodiment.

(1) High-level compatibility between the steering stability and vehicular comfort can be achieved.

When tile vehicle runs on the paved road surface (even or flat road), the vertical sprung mass velocity $V_n$ becomes small so that the control gain is set to a higher value. Thus, the steering stability can be assured and the sufficient vibration suppression characteristic can be achieved.

On the other hand, when the vehicle runs on the unpaved rough road surface, the vertical sprung mass velocity signal provides the high-frequency, large amplitude signal and the control gain is set lower. Thus, the transmission of the vibration input to the sprung mass is suppressed and the vehicular comfort can be assured.

(2) Since the control gain is set on the basis of the moving average of the peak values, the damping force characteristic does not change largely even if the impulsive input occurs.

(3) The frequency of switchings of the damping force coefficients is reduced. The response characteristic of the control can be enhanced and durability of the stepping motors 3 can be improved.

(3) As the vehicular behavior with respect to the road surface condition, only the vertical sprung mass velocity can be detected without detection of the relative velocity and utilized in the control of the damping force characteristic on the basis of the sky hook theory. Therefore, the manufacturing cost can be saved.

Second Embodiment

In the damping coefficient control apparatus in a second embodiment, the peak values in the calculation formulae (steps 105 and 108 of FIG. 14) which derive the proportional ranges $V_{H-T}$ and $V_{H-C}$ from among the control contents in the control unit 4 are set according to a frequency of the present vertical sprung mass velocity signal (control signal) $V_n$. This is a difference from the first embodiment.

in details, in the second embodiment, a frequency determination time $t_m$ ($t_1, t_2, - - -, t_n$) between a time when the vertical sprung mass velocity signal $V_n$ crosses a zero point and a time when the vertical sprung mass velocity signal $V_n$ next crosses next the zero point (half period) is measured. When each frequency determination time $t_m$ is below a predetermined threshold value $T_O$ (a time corresponding to the half period of tile sprung mass resonant frequency) ($t_m \leq T_O$), the outstanding peak value $V_{nm}$ is modified and held to correction values $V_{O-T}$ or $V_{O-C}$ which are relatively large.

Hence, since, in the second embodiment, the control gain is reduced irrespective of the actual peak values with respect to a higher frequency road surface vibration input exceeding a predetermined frequency, the vehicular comfort can be improved.

Third Embodiment

In a third embodiment, weight coefficients $f_m$ ($f_1, f_2, - - -, f_n$) based on the frequency are multiplied by the peak values $V_{nm}$ as shown in the following equation, in the calculation formulae (the steps 105 and 108 of FIG. 14) which derive the proportional ranges $V_{H-T}$ and $V_{H-C}$ from among the control contents in the control unit 4.

$$V_{H-T}=\eta_T \cdot (K_1 \cdot f_1 \cdot V_{n1}+K_2 \cdot f_2 \cdot V_{n2}+K_n \cdot f_n \cdot V_{nn})/(K_1+K_2+- -+K_n).$$

$$V_{H-C}=\eta_C \cdot (K_1 \cdot f_1 \cdot V_{n1}+K_2 \cdot f_2 \cdot V_{n2}+K_n \cdot f_n \cdot V_{nn})/(K_1+K_2+- -+K_n).$$

Figure 17:
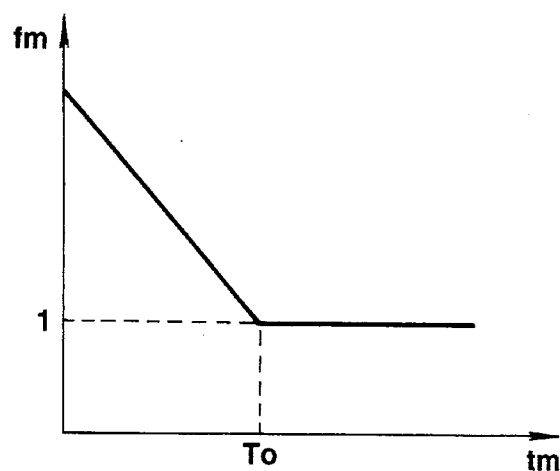
FIG. 17 is a map for deriving a correlation of a weight coefficient $f_m$ to a frequency determination time $t_m$ in a third embodiment according to the present invention.

The weight coefficients $f_m$ are set on the basis of a map shown in FIG. 17 in which correlations between the frequency determination time $t_m$ and weight coefficient $f_m$ are taken. As shown in the map shown in FIG. 17, the weight coefficient $f_m$ indicates 1 when the frequency determination time $t_m$ is above the predetermined threshold value $T_O$ (a time corresponding to the half period in the sprung mass resonant frequency). However, as the $t_m$ is below $T_O$, the weight coefficient $f_m$ is increased linearly.

In the third embodiment, the control gain is proportionally, more finely reduced and corrected according to the higher frequency road surface input exceeding the predetermined frequency. A greater vehicular comfort can be achieved.

Fourth Embodiment

In a fourth embodiment, the peak values $V_{nm}$ ($V_{n1}, V_{n2}, - - -, V_{nm}$) are modified to correction values $V_m$ ($V_1, V_2, - - -, V_n$) which accord with the outstanding frequency as described in the following equation in place of the formulae at the steps 105 and 108 of FIG. 14.

$$V_{H-T}=\eta_T \cdot (K_1 \cdot f_1 \cdot V_{n1}+K_2 \cdot f_2 \cdot V_{n2}+K_n \cdot f_n \cdot V_{nn})/(K_1+K_2+- -+K_n).$$

$$V_{H-C}=\eta_C \cdot (K_1 \cdot f_1 \cdot V_{n1}+K_2 \cdot f_2 \cdot V_{n2}+K_n \cdot f_n \cdot V_{nn})/(K_1+K_2+- -+K_n).$$

The correction value $V_m$ is derived in the following equation.

$$V_m=(T_r/t_m)^L \cdot V_{nm}.$$

In the above equation, $T_r$ denotes a fixed value representing a time of the half period ($\frac{1}{2}f_r$) in the waveform of the sprung mass resonant frequency $f_r$ and L denotes a real number.

Figure 18:
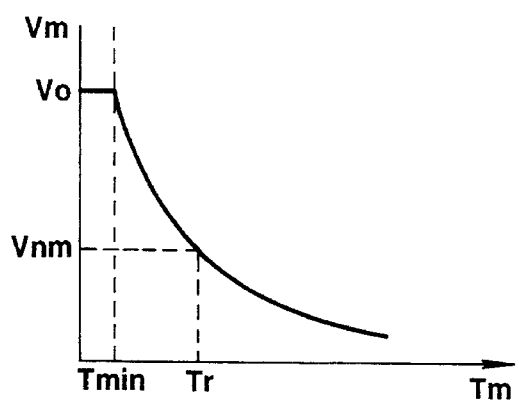
FIG. 18 is a map for deriving a correlation of a correction value $V_m$ to the frequency determination time $t_m$ in a fourth embodiment according to the present invention.
Figure 19:
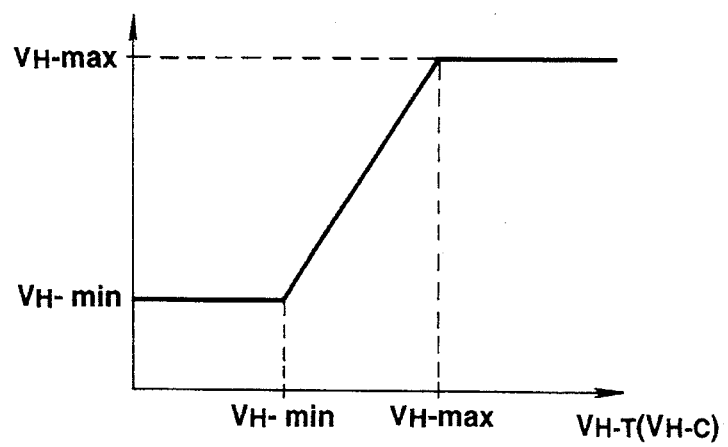
FIG. 19 is a map representing a setting characteristic of a proportional range $V_H$–HdT (and another proportional range of $V_H$–HdC) in the fourth embodiment shown in FIG. 18.

It is noted that, as shown in FIG. 18, when the frequency determination time $t_m$ is below a predetermined minimum value $t_{min}$, the correction value $V_m$ is fixed to a predetermined maximum value $V_O$. It is also noted when the above-described correction value $V_m$ is above the maximum value $V_O$, $V_m = V_O$ As shown in FIG. 19, since the maximum value $V_{H-max}$ and minimum value $V_{H-min}$ are set respectively to the proportional range of $V_{H-T}$ ( and the proportional range of $V_{H-C}$), the calculated values are fixed to the maximum or minimum value when they exceed the corresponding one of the maximum and minimum values.

Hence, in the fourth embodiment, since the control gain is more finely corrected in the direction in which the gain is proportionally reduced as the frequency becomes higher, the greater vehicular comfort can be improved.

For example, although a bouncing rate value is only used on the basis of the vertical sprung mass velocity as the control signal, the control signal may be the values to which a pitch rate and/or roll rate are added.

In the embodiments, although the vertical G sensors 1 are independently installed in proximities to the respective tire wheels, only one vertical G sensor may be used to control the damping coefficients in the bounce control mode. In the pitch and roll control mode, three vertical G sensor may be enough.

Various types of embodiments and modifications can be made within the scope of the present invention which will be defined by the appended claims.

What is claimed is:

1. An apparatus for controlling a damping force characteristic of a vehicular suspension system, said vehicular suspension system comprising at least one shock absorber interposed between a sprung mass and an unsprung mass, the damping force of said shock absorber being changeable, said apparatus comprising:

a) detecting means for detecting a sprung mass vertical acceleration with respect to a direction of gravity;

b) deriving means for deriving a vertical sprung mass velocity on the basis of the vertical sprung mass acceleration detected by the detecting means;

c) damping force characteristic controlling means for controlling the damping force characteristic of said shock absorber according to a control signal, said control signal being formed on the basis of a magnitude and a direction of the derived vertical sprung mass velocity;

d) calculating means for sampling and holding a plurality of peak values of said derived vertical sprung mass velocity with respect to time and for calculating a moving average of the plurality of the sampled and held peak values; and e) control gain setting means for adjustably setting a control gain of the formed control signal on the basis of the calculated moving average, said control signal being set such that said control gain is increased as the calculated moving average becomes decreased when said damping force characteristic controlling means controls the damping force characteristic of either a piston extension stroke side or a piston compression stroke side so as to change the damping force characteristic thereof according to the control signal.

2. An apparatus for controlling a damping force characteristic of a vehicular suspension system as claimed in claim 1, wherein predetermined weights are added to the plurality of the sampled and held peak values, said predetermined weights being set according to a derived order of the plurality of sampled and held peak values.

3. An apparatus for controlling a damping force characteristic of a vehicular suspension system as claimed in claim 1, wherein weights are added to the plurality of the sampled and held peak values according to a frequency of the derived vertical sprung mass velocity.

4. An apparatus for controlling a damping force characteristic of a vehicular suspension system as claimed in claim 1, wherein weights are added to the plurality of sampled and held peak values according to a real number value of a power of a ratio between a frequency of the derived vertical sprung mass velocity and a sprung mass resonant frequency of the vehicle.

5. An apparatus for controlling damping force characteristics of vehicular shock absorbers, said shock absorbers being interposed between a sprung mass of a vehicle body and an unsprung mass of corresponding tire wheels, respectively, said apparatus comprising:

a) damping force characteristic varying means for varying damping force characteristics of either extension piston stroke side or compression piston stroke side of the respective shock absorbers according to control signals thereto;

b) vertical sprung mass acceleration sensing means for detecting vertical sprung mass accelerations located adjacent to the shock absorbers and outputting vertical sprung mass acceleration signals indicative thereof;

c) vertical sprung mass velocity determining means for determining vertical sprung mass velocities on the basis of the detected vertical sprung mass acceleration signals and determining change in the damping force characteristics of the respective shock absorbers so as to output the control signals based on directions and magnitudes of the respectively determined vertical sprung mass velocities;

d) deriving means for sampling a plurality of peak values of the determined vertical sprung mass velocities and holding them therein, for deriving moving averages from the sampled and held plurality of peak values for the respective shock absorbers and for adjustably setting control gains for the drive signals with respect to the vertical sprung mass velocities when the damping force characteristics of either the extension or compression strokes of the pistons of the respective shock absorbers are changed according to the control signals, said control gains being set such that as each one of the derived moving averages becomes smaller, the corresponding one of the control gains for each one of the shock absorbers becomes larger.

6. An apparatus for controlling damping force characteristics of vehicular shock absorbers, said shock absorbers being interposed between a sprung mass of a vehicle body and an unsprung mass of corresponding tire wheels, respectively, as claimed in claim 5, wherein vertical sprung mass determining means comprises a plurality of low pass filters (LPF2) which integrate the input vertical sprung mass acceleration signals with respect to time and provide the vertical sprung mass velocity signals as signals ($V_n$) for the deriving means and a plurality of band pass filters (BPF) which are so constructed as to filter a frequency range including a sprung mass resonant frequency from the input vertical sprung mass velocity signals.

7. An apparatus for controlling damping force characteristics of vehicular shock absorbers, said shock absorbers being interposed between a sprung mass of a vehicle body and an unsprung mass of corresponding tire wheels, respectively, as claimed in claim 6, which further comprises: comparing means for determining whether the directions and magnitudes of the respective vertical sprung mass velocity signals fall in a dead zone defined by both upper and lower threshold values $V_{NC-T}$, $V_{NC-C}$, and wherein said control signals are output to the damping force characteristic varying means depending on the results of determination by said comparing means.

8. An apparatus for controlling damping force characteristics of vehicular shock absorbers, said shock absorbers being interposed between a sprung mass of a vehicle body and an unsprung mass of corresponding tire wheels, respectively, as claimed in claim 7, wherein when one of the vertical sprung mass velocity signals falls in a dead zone range, the corresponding one of the shock absorbers is controlled via said control signal so that both extension and compression stroke sides are in relatively soft damping force characteristics (SS), and wherein when one of the vertical sprung mass velocity signals exceeds a positive threshold value of $V_{NC}$-T, an extension stroke positional range is derived as follows:

$$V_{H-T} = \eta_T \cdot (K_1 \cdot V_{n1} + K_2 \cdot V_{n2} + \cdots + K_n \cdot V_{n1})/(K_1 + K_2 + \cdots + K_n),$$

wherein $\eta_T$ denotes an extension stroke side proportional range adjustment coefficient, $V_{n1}$, $V_{n2}$, - - -, $V_{nn}$ denote the peak values for every half period of the corresponding one of the vertical sprung mass velocity signals, subscripts 1, 2,- - -, n denote the past data as the numerical values become larger, and $K_1$, $K_2$,- - -, $K_n$ denotes extension stroke side weight coefficients, and the corresponding one of the shock absorbers is controlled such that a position of the damping force coefficient varying means is derived as PT $= P\max{}_T \cdot (V_n - V_{NC-T})/(V_{H-T} V_{NC-T})$ and the damping force coefficient of the extension stroke thereof is controlled in a extension stroke side relatively hard damping force characteristic and in a compression stroke side relatively soft damping force characteristic.

9. An apparatus for controlling damping force characteristics of vehicular shock absorbers, said shock absorbers being interposed between a sprung mass of a vehicle body and an unsprung mass of corresponding tire wheels, respectively, as claimed in claim 8, wherein when one of the vertical sprung mass velocity signals is below a negative threshold value of $V_{NC-C}$, a compression stroke side proportional range $V_{H-C}$ is derived as follows:

$$V_{H-C} = \eta_C \cdot (K_1 \cdot V_{n1} + K_2 \cdot V_{n2} + \cdots + K_n \cdot V_{nn})/K_1 + K_2 + \cdots + K_n,$$

wherein $\eta_C$ denotes a compression stroke side proportional range adjustment coefficient, $V_{n1}, V_{n2}, \cdots, V_{nn}$ denote the peak values for every half period of the corresponding one of the vertical sprung mass velocity signals, subscripts 1, 2, ---, n denote the past data as the numerical values become larger, and $K_1, K_2, ---, K_n$ denote compression stroke side weight coefficients, and wherein a damping force characteristic position is derived as follows:

$$P_C = Pmax_{-C} \cdot (|Vn| - |V_{NC-C}|)/(|V_{H-C}| |V_{NC-C}|)$$

and the corresponding one of the shock absorbers is controlled in a compression stroke side relatively hard damping force characteristic and in an extension stroke side relatively soft damping force characteristic.

10. An apparatus for controlling damping force characteristics of vehicular shock absorbers, said shock absorbers being interposed between a sprung mass of a vehicle body and an unsprung mass of corresponding tire wheels, respectively, as claimed in claim 9, wherein the plurality of peak values are past four as $V_{n1} = (V_{n1}, V_{n2}, \cdots, V_{n4})$.

11. An apparatus for controlling damping force characteristics of vehicular shock absorbers, said shock absorbers being interposed between a sprung mass of a vehicle body and an unsprung mass of corresponding tire wheels, respectively, as claimed in claim 9, wherein the peak values are set depending on a frequency of each of the vertical sprung mass velocity signals.

12. An apparatus for controlling damping force characteristics of vehicular shock absorbers, said shock absorbers being interposed between a sprung mass of a vehicle body and an unsprung mass of corresponding tire wheels, respectively, as claimed in claim 9, wherein the peak values are set which are multiplied by coefficients $f_m(f_1, f_2, \cdots, f_n)$.

13. An apparatus for controlling damping force characteristics of vehicular shock absorbers, said shock absorbers being interposed between a sprung mass of a vehicle body and an unsprung mass of corresponding tire wheels, respectively, as claimed in claim 9, wherein the peak values are modified as $V_m(V_1, V_2, \cdots, V_n)$ which are in accordance with the outstanding frequency of the corresponding vertical sprung mass velocity signal.

14. A method for controlling a damping force characteristic of a vehicular suspension which includes a shock absorber with a changeable damping force characteristic responsive to a damping force characteristic changing member, comprising the steps of:

a) detecting a sprung mass vertical acceleration;

b) deriving a vertical sprung mass velocity on the basis of the detected vertical sprung mass acceleration;

c) controlling the damping force characteristic of the shock absorber on the basis of a magnitude and direction of the derived vertical sprung mass velocity via a drive signal input to the damping force characteristic changing member of said shock absorber; and d) sampling and holding a plurality of peak values of said derived vertical sprung mass velocity with respect to time, calculating a moving average of the plurality of sampled and held peak values, and adjusting a control gain of the derived vertical sprung mass velocity for the drive signal so that the damping force characteristic changing member changes the damping force characteristic of the shock absorber according to the drive signal input thereto, said control gain being increased as the calculated moving average becomes decreased.

15. A method for controlling a damping force characteristic of a vehicular suspension system having at least one shock absorber interposed between a sprung mass and an unsprung mass, the damping force of said shock absorber being changeable, said method comprising the steps of:

a) detecting a sprung mass vertical acceleration;

b) deriving a vertical sprung mass velocity on the basis of the vertical sprung mass acceleration detected in said detecting step;

c) controlling a damping force characteristic of said shock absorber according to a control signal formed on the basis of a magnitude and a direction of the derived vertical sprung mass velocity;

d) sampling and holding a plurality of peak values of said derived vertical sprung mass velocity with respect to time and calculating a moving average of the plurality of the sampled and held peak values; and e) adjustably setting a control gain of the formed control signal on the basis of the calculated moving average so that said control gain is increased as the calculated moving average becomes decreased when said damping force characteristic of either a piston extension stroke side or a piston compression stroke side is changed according to the control signal.

* * * * *